United States Patent
Novosad

(10) Patent No.: US 7,930,557 B2
(45) Date of Patent: Apr. 19, 2011

(54) FRAMEWORK FOR EMBEDDING GRAPHICAL PROCESSING UNIT PROGRAMS IN COMPUTER SOFTWARE

(75) Inventor: Justin Peace Novosad, Verdun (CA)

(73) Assignee: Autodesk, Inc., San Rafael, CA (US)

( * ) Notice: Subject to any disclaimer, the term of this patent is extended or adjusted under 35 U.S.C. 154(b) by 1295 days.

(21) Appl. No.: 11/434,823

(22) Filed: May 16, 2006

(65) Prior Publication Data

US 2007/0268297 A1 Nov. 22, 2007

(51) Int. Cl.
*H04L 9/32* (2006.01)
*G06F 11/30* (2006.01)
*G06F 12/14* (2006.01)
*G06F 15/76* (2006.01)

(52) U.S. Cl. ........... 713/190; 713/179; 713/189; 725/31

(58) Field of Classification Search .................. 713/189, 713/179, 190; 725/31
See application file for complete search history.

(56) References Cited

U.S. PATENT DOCUMENTS

| 6,684,389 | B1* | 1/2004 | Tanaka et al. .................. 717/140 |
| 7,093,119 | B2* | 8/2006 | Rhodes ............................. 713/2 |
| 2002/0053024 | A1* | 5/2002 | Hashimoto et al. ........... 713/168 |
| 2004/0015710 | A1* | 1/2004 | Rhodes ......................... 713/193 |
| 2004/0034794 | A1* | 2/2004 | Mayer et al. .................. 713/200 |
| 2004/0115860 | A1* | 6/2004 | Johnson et al. ............... 438/102 |
| 2005/0122330 | A1* | 6/2005 | Boyd et al. .................... 345/501 |
| 2006/0082837 | A1* | 4/2006 | Hiroe et al. .................... 358/448 |
| 2006/0098017 | A1* | 5/2006 | Tarditi et al. .................. 345/505 |

OTHER PUBLICATIONS

Debra L. Cook et al, Remotely keyed cryptographics secure remote display access using (mostly) untrusted hardware, CU, 2005, pp. 364-375.*

* cited by examiner

*Primary Examiner* — Nasser Moazzami
*Assistant Examiner* — Mohammad W Reza
(74) *Attorney, Agent, or Firm* — Gates & Cooper LLP

(57) ABSTRACT

A computer-implemented method, apparatus, and article of manufacture provide a framework for embedding a graphical processing unit (GPU) program in computer software. A GPU program, that can be loaded and executed by a GPU, is obtained and encrypted to create an encrypted GPU program. The encrypted GPU program is stored in a source code file for the computer software and then compiled.

12 Claims, 3 Drawing Sheets

US 7,930,557 B2

FRAMEWORK FOR EMBEDDING GRAPHICAL PROCESSING UNIT PROGRAMS IN COMPUTER SOFTWARE

BACKGROUND OF THE INVENTION

1. Field of the Invention

The present invention relates generally to image/video display and processing systems, and in particular, to a method, apparatus, and article of manufacture for protecting proprietary graphical processing unit (GPU) software from external access.

2. Description of the Related Art

Current graphics processing units (GPUs) (also referred to as video processing units [VPUs], graphics cards, or video cards) can be programmed in order to customize their functionality. GPU programming is a very powerful and versatile technology because it allows software developers to implement complex imaging and data processing algorithms and execute the algorithms at high speeds on a computer workstation's GPU. However, the source code of a GPU program must be loaded (and compiled) by the operating system and/or a display driver at application run time. As used herein, a display driver comprises software provided by a GPU vendor to facilitate the operation of the GPU. Accordingly, the uncompiled source code of the GPU program must be included in the software that is distributed to end-users (e.g., as text files or embedded in binary files). Such a distribution of GPU programming exposes a serious risk of reverse engineering and plagiarism of proprietary source code. Such problems may be better understood with an explanation of graphics processing units and prior art distribution methods.

A GPU is a specialized logic chip or card that is devoted to rendering 2D or 3D images. Display adapters often contain one or more GPUs for fast graphics rendering. The more sophisticated and faster the GPUs, combined with the architecture of the display adapter, the more realistically games and video are displayed. GPUs may each have particular video/display capabilities for use in different environments. For example, GPU may provide capabilities for texturing, shading, filtering, blending, rendering, interlacing/de-interlacing, scaling, multiple GPU parallel execution, color correction, encoding, TV output, etc.

To customize the functionality and capabilities of a GPU, GPU programming is used. Considerable amounts of time and money may be incurred in developing GPU programs. Accordingly, it may be desirable to retain such proprietary GPU programs as trade secrets. However, as described above, the source code of the GPU must be loaded (and compiled) by an operating system at run time. Therefore, the uncompiled source code of the GPU program may be easily accessible (e.g., to an end-user or developer). In this regard, certain keywords are often found in a GPU program. Accordingly, the executable can merely be scanned for such keywords and the GPU program can be found and easily replicated.

Accordingly, what is needed is a framework for protecting GPU programs in computer software executable files.

SUMMARY OF THE INVENTION

Graphical processing units (GPUs) may be customized through GPU programs. However, such GPU programs must be loaded and compiled by the operating system or another application at application run time. Accordingly, any proprietary GPU programs or GPU programs that contain trade secrets may be easily identified, reverse engineered, and or plagiarized.

To overcome the deficiencies of the prior art, one or more embodiments of the invention provide a framework for embedding encrypted GPU programs into computer software. The raw GPU programs are stored in source files with the remaining source files for a primary application/program. At compilation time, the GPU programs are processed by a source code generator, that encrypts the GPU programs (e.g., using a randomly generated encryption key and an undisclosed encryption algorithm). The encrypted programs (and potentially the respective decryption keys) are then stored as constants in the source code file (i.e., thereby appearing merely as part of the source code). In addition, the necessary code to decrypt and load the decrypted GPU program may also be stored in the source code files.

The generated source code files are then compiled and linked into the program's executable binaries (or a dynamic library). A GPU program manager library may then use the code needed to decrypt the code and load the GPU program. The GPU program manager library may also be responsible for ensuring that the decryption code and information remains protected. Thus, the GPU program is protected in the software that is distributed (e.g., via the encryption) and can only be decrypted by the appropriate software (e.g., the GPU program manager library) during application run time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
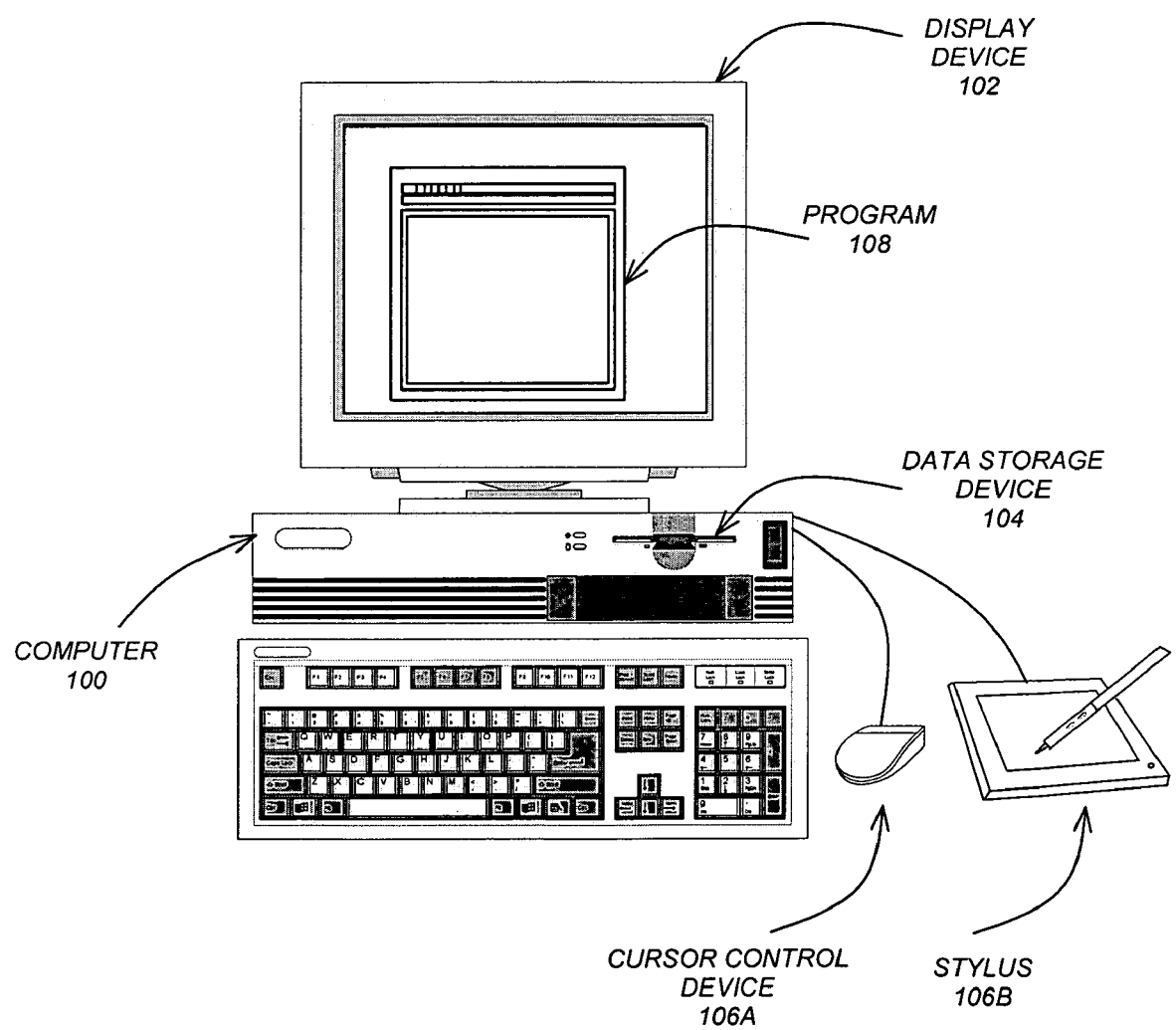
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage device(s) 104, cursor control devices 106A, stylus 106B, and other devices. Those skilled in the art will recognize that any combination of the above components, or any number of different components, peripherals, and other devices, may be used with the computer 100.

One or more embodiments of the invention are implemented by a computer-implemented program 108 (or multiple programs 108). Such a program may be a compiler, a parser, a shader, a shader manager library, a GPU program, or any type of program that executes on a computer 100. The program 108 may be represented by one or more windows displayed on the display device 102. Generally, the program 108 comprises logic and/or data embodied in/or readable from a device, media, carrier, or signal, e.g., one or more fixed and/or removable data storage devices 104 connected directly or indirectly to the computer 100, one or more remote devices coupled to the computer 100 via a data communications device, etc. In addition, program 108 (or other programs described herein) may be an object-oriented program having objects and methods as understood in the art. Further, the program 108 may be written in any programming language including C, C++, Pascal, Fortran, Java™, etc. Further, as used herein, multiple different programs may be used and communicate with each other.

Figure 2:
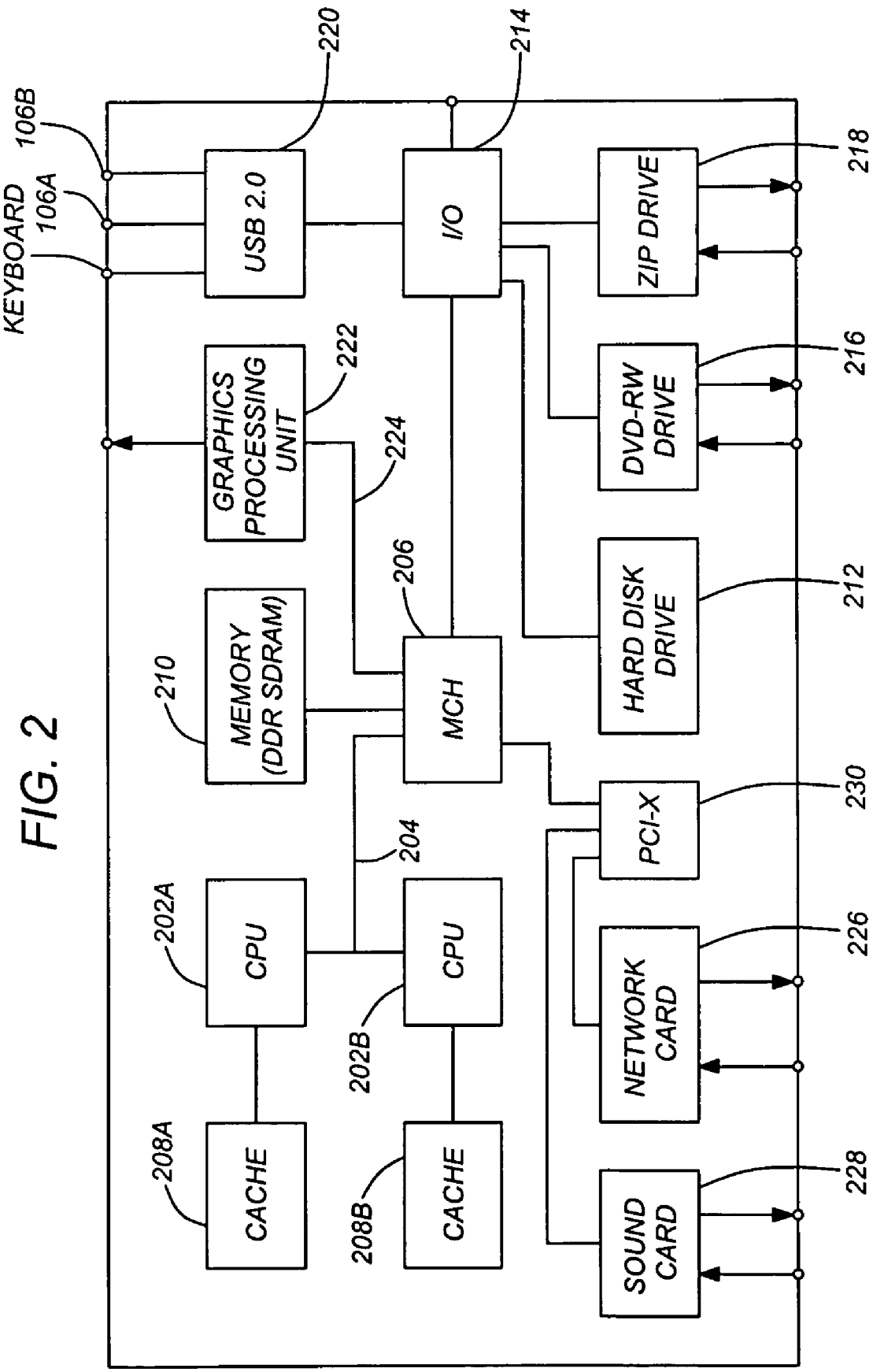
FIG. 2 illustrates details of the computer system of FIG. 1 in accordance with one or more embodiments of the invention.

The components of computer system 100 are further detailed in FIG. 2 and, in one or more embodiments of the present invention, said components may be based upon the Intel® E7505 hub-based chipset.

The system 100 includes two central processing units (CPUs) 202A, 202B (e.g., Intel® Pentium™ Xeon™ 4 DP CPUs running at three Gigahertz, or AMD™ CPUs such as the Opteron™/Athlon X2™ /Athlon™ 64), that fetch and execute instructions and manipulate data via a system bus 204 providing connectivity with a Memory Controller Hub (MCH) 206. CPUs 202A, 202B are configured with respective high-speed caches 208A, 208B (e.g., that may comprise at least five hundred and twelve kilobytes), which store frequently accessed instructions and data to reduce fetching operations from a larger memory 210 via MCH 206. The MCH 206 thus co-ordinates data flow with a larger, dual-channel double-data rate main memory 210 (e.g., that is between two and four gigabytes in data storage capacity) and stores executable programs which, along with data, are received via said bus 204 from a hard disk drive 212 providing non-volatile bulk storage of instructions and data via an Input/Output Controller Hub (ICH) 214. The I/O hub 214 similarly provides connectivity to DVD-ROM read-writer 216 and ZIP™ drive 218, both of which read and write data and instructions from and to removable data storage media. Finally, I/O hub 214 provides connectivity to USB 2.0 input/output sockets 220, to which the stylus and tablet 106B combination, keyboard, and mouse 106A are connected, all of which send user input data to system 100.

A graphics card (also referred to as a graphics processing unit [GPU]) 222 receives graphics data from CPUs 202A, 202B along with graphics instructions via MCH 206. The GPU 222 may be coupled to the MCH 206 through a direct port 224, such as the direct-attached advanced graphics port 8X (AGP™ 8X) promulgated by the Intel® Corporation, or the PCI-Express™ (PCIe) x16, the bandwidth of which may exceed the bandwidth of bus 204. The GPU 222 may also include substantial dedicated graphical processing capabilities, so that the CPUs 202A, 202B are not burdened with computationally intensive tasks for which they are not optimized.

Network card 226 provides connectivity to a framestore by processing a plurality of communication protocols, for instance a communication protocol suitable to encode and send and/or receive and decode packets of data over a Gigabit-Ethernet local area network. A sound card 228 is provided which receives sound data from the CPUs 202A, 202B along with sound processing instructions, in a manner similar to GPU 222. The sound card 228 may also include substantial dedicated digital sound processing capabilities, so that the CPUs 202A, 202B are not burdened with computationally intensive tasks for which they are not optimized. Network card 226 and sound card 228 may exchange data with CPUs 202A, 202B over system bus 204 by means of a controller hub 230 (e.g., Intel®'s PCI-X controller hub) administered by MCH 206.

Those skilled in the art will recognize that the exemplary environment illustrated in FIGS. 1 and 2 are not intended to limit the present invention. Indeed, those skilled in the art will recognize that other alternative environments may be used without departing from the scope of the present invention.

Software Environment

A GPU 222 may utilize proprietary code (referred to as a GPU program) that customizes the operation and functionality of the GPU 222. As used herein, the term "GPU program" represents any and all types of programs that may be loaded and executed by a GPU 222, which includes (but is not limited to) fragment programs, vertex programs, and shaders or shader code (including fragment shaders, vertex shaders and pixel shaders). However, since such GPU programs must be loaded (and compiled) at run time, the uncompiled source code is included in software that is distributed (e.g., as a text file or an embedded binary file). Such uncompiled source code may then be easily extracted and replicated thereby creating a security hole for trade secret issues.

In view of the above, it may be noted that source code trees are often utilized during programming to organize the various programming modules or functions (e.g., in a particular hierarchy). A tree structure provides branches that specify a hierarchy for function calls among modules/functions/classes of a program. One or more files or parts of files may be part of the source code tree in a programming environment.

To protect the GPU programs from improper access and use, the invention provides a framework for encrypting GPU program source code while remaining transparent to programmers/developers. The GPU program remains part of the files (i.e., among the other source files) in a source code tree. At compile time (i.e., prior to distribution of the software), the GPU program is encrypted. Such encryption is transparent to the programmer and is automatic (i.e., without requiring the user to perform any further action to enable such encryption). The encrypted GPU program and decryption key are embedded into a source code file (e.g., a C++ source code file). The source code files are then compiled and integrated together or linked into the primary program or dynamic link library that is distributed. Subsequently, at run time, the primary program or an application that accesses (or executes) the primary program is capable of decrypting the GPU program when needed.

Logical Flow

There are essentially two steps that are utilized to protect a GPU program. In the first step, a temporary file containing the encrypted GPU program is created. In the second step, the temporary file is compiled with the remaining files of the program and linked appropriately.

Figure 3:
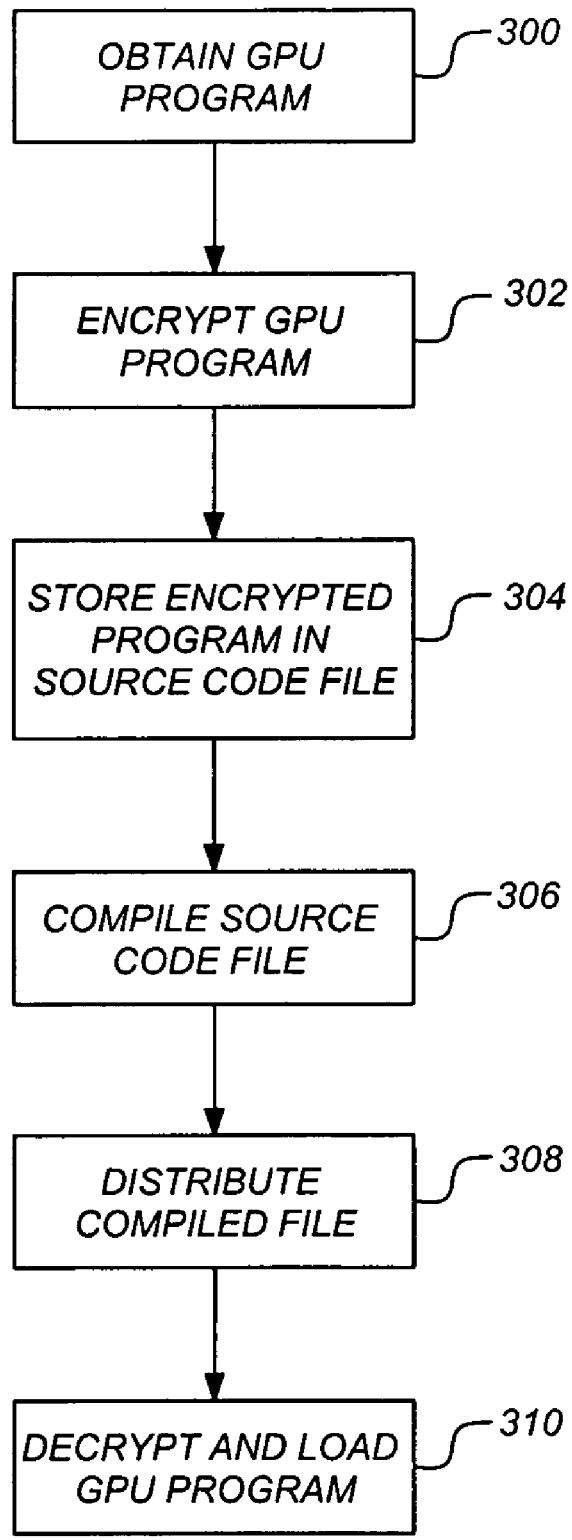
FIG. 3 illustrates the logical flow for protecting a GPU program in accordance with one or more embodiments of the invention.

FIG. 3 illustrates the logical flow for protecting a GPU program in accordance with one or more embodiments of the invention. At step 300, a GPU program is obtained. As described above, a GPU program is any program that can be loaded and executed by a GPU. Step 300 may also include the storing of the raw GPU programs into source files (e.g., in a source code tree).

Step 302 may be performed at compile time (or prior to compile time), and consists of the processing of the GPU programs by a source code generator. The source code generator encrypts the GPU programs (and produces generated source code containing the encrypted GPU program). Such encryption may utilize a randomly generated encryption key and an undisclosed encryption algorithm. It should be noted that since the encrypted GPU programs and their respective decryption keys may both be stored in a binary file (or dynamic link library) that is part of the software distribution (see below), the use of an undisclosed proprietary encryption algorithm may be preferred to adequately hinder potential reverse engineering efforts. In this regard, the particular proprietary encryption algorithm, the type of algorithm, or other information relating to the algorithm may not be disclosed to any other party (but for the component that will perform the decryption). An example of step 302 may provide for converting the GPU program into the generated source code such as a string or constant.

At step 304, the encrypted program is stored in a source code file (i.e., source code files for the primary software program that utilizes the GPU program). An example of step 304 is the storage of the encrypted string into a C++ file. Further, in addition to storing the encrypted GPU program, respective decryption keys (that can be used to decrypt the encrypted GPU program) may also be stored in the source code files. For example, the encrypted GPU programs and decryption keys may be stored as constants in a generated C-language (or other language) source code file. Further, code that may be needed to decrypt and load a decrypted GPU program may also be stored in the source code file.

At step 306, the source code file containing the encrypted GPU program (and potentially the decryption keys and code) is compiled by the appropriate compiler and linked to the primary software program to be distributed. For example, the source code file with an encrypted string may be processed through a C++ compiler and then linked to the other compiled files (i.e., to produce the primary/main executable file). Thus, the generated source code files (i.e., containing the encrypted GPU programs, decryption keys, and code necessary to perform the decryption and loading of the GPU program) are compiled and integrated or linked into the computer program's executable binaries (or a dynamic library). It should be noted that since the GPU program must be compiled and loaded at application run-time, the storage of the GPU program in an encrypted form as a constant (e.g., a string) will preserve the nature of the GPU program during the compilation process for the primary software program.

At step 308, the compiled primary software program is distributed. At step 310, the GPU program within the compiled primary software program is decrypted and loaded by the operating system (or other application) at run time. In this regard, such a decrypting and loading of the GPU program may be performed by an additional program referred to as a GPU program manager, GPU program manager library, or shader manager library. Such a GPU program manager library manages all of the GPU programs and performs any necessary decrypting and loading of the GPU program to the display driver as needed. The GPU program manager library may also maintain knowledge regarding the proprietary encryption algorithm that is utilized so that the GPU program can be decrypted. Such knowledge may be transmitted via wired or wireless means to the GPU program manager library. Alternatively, the GPU program manager library may be provided such encryption algorithm information upon creation/initialization of the GPU program manager library.

The GPU program manager may also provide an additional level of protection. Namely, the GPU program manager may determine whether a debugger is attached to the program. For example, if an unauthorized user is attempting to gain access to the GPU program, the user may attach a debugging application or attempt to reverse compile the compiled source code files. As part of such a debugging operation, break points or watch points must be set. Such break points utilize a special setting in a CPU 202A or 202B or leave distinctive traces in memory that are hard to dissimulate. The GPU program manager library is capable of detecting such breakpoint settings. The GPU program manager is also capable of detecting intrusions in parts of the operating system and display driver that represent a security risk for accessing GPU program code.

When the GPU program manager determines that a debugger is attached to the software program (e.g., via a determination that breakpoints or watchpoints have been set) or detects that there has been an intrusion into the computer software, operating system, or display driver, the initialization phase of the GPU program manager may be bypassed or disabled. Such a disabling may not cause the software program to instantly fail. Instead, when the user subsequently attempts to utilize the GPU program, the software will fail/crash based on the lack of initialization of the GPU program manager. Such a disabling/bypassing effectively prevents hackers or unauthorized users from monitoring, spying, or obtaining information relating to the decryption process.

Accordingly, the GPU program manager library further enables the protection of proprietary GPU program code that has been encrypted and stored within the source code files (or linked into a dynamic link library) for the primary software program that is distributed.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Further, any type of programming language or programming language components could be used with the present invention. In addition, any combination either alone or together of the above-described components could be used within the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for embedding a graphical processing unit (GPU) program in computer software comprising:
   obtaining, in a computer, a GPU program comprising a program that can be loaded and executed by a GPU;
   encrypting, in the computer, the GPU program to create an encrypted GPU program; storing, in the computer, the encrypted GPU program in a source code file for the computer software wherein the GPU program is encrypted using an encryption key; and
   a corresponding decryption key is stored in the source code file; and
   compiling, in the computer, the source code file that includes the stored encrypted GPU program, wherein the stored encrypted GPU program appears as part of the compiled source code file.

2. The method of claim 1 wherein the GPU program is encrypted at compilation time.

3. The method of claim 1 wherein decryption code comprising necessary code for decrypting the encrypted GPU program, is stored in the source code file.

4. The method of claim 1 further comprising bypassing an initialization phase of the GPU program when an intrusion into the computer software, an operating system, or a display driver is detected.

5. A computer implemented system for embedding a graphical processing unit (GPU) program in computer software comprising:
(a) a computer;
(b) a graphics processing unit (GPU) installed on the computer;
(c) a GPU program comprising a program that can be loaded and executed by the GPU;
(d) a source code generator executing on the computer, wherein the source code generator is configured to:
(i) encrypt the GPU program to create an encrypted GPU program wherein the GPU program is encrypted using an encryption key; and a corresponding decryption key is stored in the source code file; and
(ii) store the encrypted GPU program in a source code file; and
(e) a compiler configured to compile the source code file that includes the stored encrypted GPU program, wherein the stored encrypted GPU program appears as part of the compiled source code file.

6. The system of claim 5 wherein the GPU program is encrypted at compilation time.

7. The system of claim 5 wherein:
the source code generator is further configured to provide decryption code comprising necessary code for decrypting the encrypted GPU program; and
the decryption code is stored in the source code file.

8. The system of claim 5 further comprising a GPU manager library that is executing on the computer, wherein the GPU manager library is configured to bypass an initialization phase of the GPU program when an intrusion into the computer software, an operating system, or a display driver is detected.

9. A program storage device, readable by a computer, tangibly embodying at least one program of instructions executable by the computer to perform method steps of embedding a graphical processing unit (GPU) program in computer software the method steps comprising the steps of:
obtaining a GPU program comprising a program that can be loaded and executed by a GPU in the computer;
encrypting the GPU program to create an encrypted GPU program;
storing the encrypted GPU program in a source code file for the computer software wherein the GPU program is encrypted using an encryption key; and a corresponding decryption key is stored in the source code file; and
compiling the source code file that includes the stored encrypted GPU program, wherein the stored encrypted GPU program appears as part of the compiled source code file.

10. The article of manufacture of claim 9 wherein the GPU program is encrypted at compilation time.

11. The article of manufacture of claim 9 wherein decryption code comprising necessary code for decrypting the encrypted GPU program, is stored in the source code file.

12. The article of manufacture of claim 9, the method steps further comprising bypassing an initialization phase of the GPU program when an intrusion into the computer software, an operating system, or a display driver is detected.

* * * * *

UNITED STATES PATENT AND TRADEMARK OFFICE
CERTIFICATE OF CORRECTION

PATENT NO. : 7,930,557 B2  
APPLICATION NO. : 11/434823  
DATED : April 19, 2011  
INVENTOR(S) : Justin Peace Novosad Page 1 of 1

It is certified that error appears in the above-identified patent and that said Letters Patent is hereby corrected as shown below:

In the Claims

Column 8, line 22, Claim 10, please delete the phrase, "The article of manufacture of claim 9..." and replace with, "The program storage device of claim 9...".

Column 8, line 24, Claim 11, please delete the phrase, "The article of manufacture of claim 9..." and replace with, "The program storage device of device 9...".

Column 8, line 27, Claim 12, please delete the phrase, "The article of manufacture of claim 9..." and replace with, "The program storage device of claim 9...".

Signed and Sealed this
Twentieth Day of May, 2014

Michelle K. Lee
*Deputy Director of the United States Patent and Trademark Office*